(12) United States Patent
Takada et al.

(10) Patent No.: US 12,405,855 B2
(45) Date of Patent: Sep. 2, 2025

(54) STORAGE DEVICE AND A METHOD OF ERROR PROCESSING THEREOF

(71) Applicant: HITACHI, LTD., Tokyo (JP)

(72) Inventors: Masanori Takada, Tokyo (JP); Katsuya Tanaka, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 0 days.

(21) Appl. No.: 18/609,039

(22) Filed: Mar. 19, 2024

(65) Prior Publication Data
US 2025/0138943 A1    May 1, 2025

(30) Foreign Application Priority Data
Oct. 30, 2023    (JP) .................................. 2023-185681

(51) Int. Cl.
| G06F 11/00 | (2006.01) |
| G06F 11/10 | (2006.01) |
| G06F 12/0871 | (2016.01) |
| G06F 12/126 | (2016.01) |

(52) U.S. Cl.
CPC ...... *G06F 11/1064* (2013.01); *G06F 12/0871* (2013.01); *G06F 12/126* (2013.01)

(58) Field of Classification Search
None
See application file for complete search history.

(56) References Cited

U.S. PATENT DOCUMENTS

| 12,094,503 B1* | 9/2024 | Guo ..................... G11B 5/5547 |
| 2004/0123068 A1 | 6/2004 | Hashimoto |
| 2009/0006705 A1* | 1/2009 | Bartley ............... G06F 13/4243 710/310 |
| 2012/0144252 A1* | 6/2012 | Takada ................ G06F 11/2089 714/E11.179 |
| 2016/0048425 A1* | 2/2016 | Kim ...................... G11C 29/52 714/764 |
| 2019/0303236 A1* | 10/2019 | Ellis ....................... G06F 3/065 |
| 2024/0069997 A1* | 2/2024 | Bukhari .............. G06F 12/0215 |
| 2024/0420735 A1* | 12/2024 | Galbraith ......... G11B 20/10037 |

FOREIGN PATENT DOCUMENTS

JP    2004-199420 A    7/2004

* cited by examiner

*Primary Examiner* — Mujtaba M Chaudry
(74) *Attorney, Agent, or Firm* — Foley & Lardner LLP

(57) ABSTRACT

In a storage device including a plurality of controllers for controlling data reading and writing operations with respect to at least one host computer, each of the controllers includes: a cache region to which a plurality of management units capable of temporarily storing the data are allocated in accordance with the data reading and writing operations; and a control unit for controlling the data reading and writing operations, and when an error occurs, the control unit determines whether or not an occurrence position of the error is in the cache region, and when it is determined that the occurrence position is in the cache region, the control unit excludes, among the plural management units, a specific management unit that contains the occurrence position from an allocation target in the cache region, to control the data reading and writing operations using remaining management units in the plural management units.

10 Claims, 8 Drawing Sheets

FIG. 2
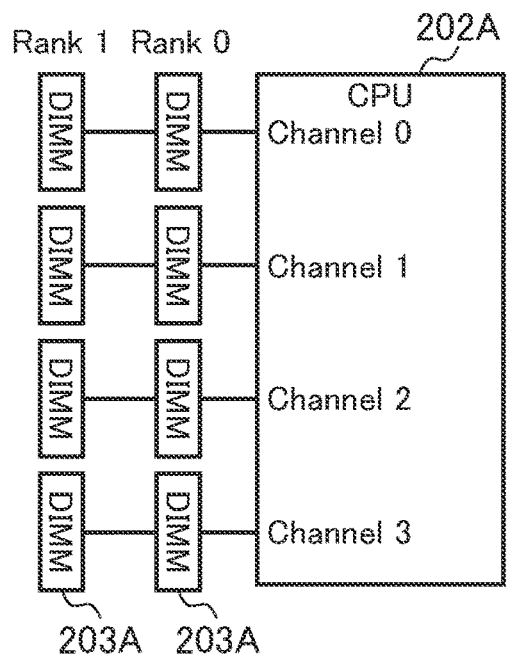
FIG. 3
| ITEM | SET VALUE |
|---|---|
| Channel SELECTION BIT | 6 – 7 |
| Rank SELECTION BIT | 8 |
FIG. 4
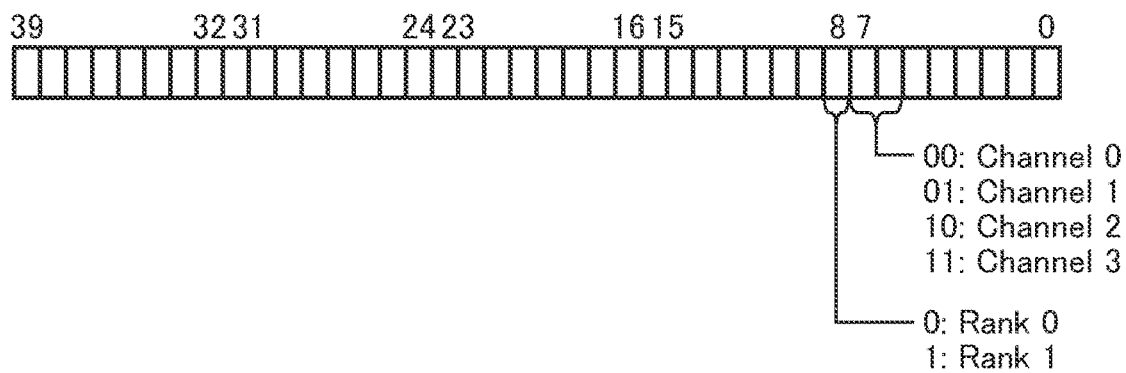

FIG. 5

HARDWARE FAILURE MANAGEMENT TABLE                                         211

| ERROR NO. | ERROR OCCURENCE ADDRESS | OCCURRENCE OF UNCORRECTABLE ERROR | NUMBER OF CORRECTABLE ERROR OCCURRENCES |
|---|---|---|---|
| #0 | 0x012345640 | Y | 0 |
| #1 | 0x2c003e4c0 | N | 10 |
| #2 | 0c3f20e600 | N | 50 |

FIG. 6

REPLACEMENT TARGET MANAGEMENT TABLE                                       212

| REPLACEMENT TARGET LIST | SERIAL NO. |
|---|---|
| DIMM (Ch 0, Rank1) | 0x12345678 |
| ... | ... |

FIG. 7

CACHE DIRECTORY 213

| VOLUME NO. | SEGMENT NO. IN VOLUME | SEGMENT NO. IN CACHE REGION | ATTRIBUTE |
|---|---|---|---|
| 0 | 0 | 3 | Clean |
| 0 | 1 | 1 | Dirty |
| 0 | ... | ... | ... |
| 1 | 0 | 4 | Clean |
| 1 | 1 | - | - |
| 1 | ... | ... | ... |
| ... | ... | ... | ... |

FIG. 8

REVERSE LOOKUP TABLE    205C

| SEGMENT NO. IN CACHE REGION | VOLUME NO. | SEGMENT NO. IN VOLUME |
|---|---|---|
| 0 | – | – |
| 1 | 0 | 1 |
| 2 | – | – |
| 3 | 0 | 0 |
| 4 | 1 | 0 |
| 5 | – | – |
| ... | ... | ... |

FIG. 9

FREE LIST    205D

| NO. OF UNUSED SEGMENT IN CACHE REGION |
|---|
| 0 |
| 5 |
| ... |

FIG. 10

USAGE EXCLUSION LIST    205E

| NO. OF UNUSABLE SEGMENT IN CACHE REGION |
|---|
| 2 |
| ... |

STORAGE DEVICE AND A METHOD OF ERROR PROCESSING THEREOF

BACKGROUND

The present invention relates to a storage device and an error processing method. Preferably, the present invention is applicable to a storage device configured to prevent blocking of an entire controller despite an error that occurs in the cache region of the storage device.

A generally employed storage device has multiple controllers each provided with a memory and a cache region, and executes data reading/writing operations with respect to a host via a host I/F (Interface). The storage device is configured to duplex data in the memories and cache regions of the respective controllers. When an error occurs in the memory or the cache region of any one of the controllers, the controller having the error is blocked to allow the other controller to continue data reading/writing operations (refer to Japanese Unexamined Patent Application Publication No. 2004-199420).

SUMMARY

Upon occurrence of an error in the memory or the cache region of the controller, the storage device as disclosed in Japanese Unexamined Patent Application Publication No. 2004-199420 cannot continue the data reading/writing operations via the host I/F using the controller having the error. Accordingly, the storage device as a whole has to be operated in the state where the data duplexing is deteriorated.

The present invention has been made to propose a storage device and an error processing method to prevent blocking of the controller having an error which occurs in a cache region as much as possible.

Solution to Problem

In order to solve the above problems, the storage device comprises a plurality of controllers for controlling data reading and writing operations with respect to at least one host computer. In the storage device, each of the controllers includes: a cache region to which a plurality of management units capable of temporarily storing the data are allocated in accordance with the data reading and writing operations; and a control unit for controlling the data reading and writing operations, and when an error occurs, the control unit determines whether or not an occurrence position of the error is in the cache region, and when it is determined that the occurrence position is in the cache region, the control unit excludes, among the plural management units, a specific management unit that contains the occurrence position from an allocation target in the cache region, to control the data reading and writing operations using remaining management units in the plural management units.

Further, in the present invention, the error processing method for a storage device having a plurality of controllers each provided with a control unit for controlling data reading and writing operations with respect to at least one host computer, comprises: a management unit allocation step for causing the control unit to allocate a plurality of management units capable of temporarily storing the data to each cache region of the controllers in accordance with the data reading and writing operations; a determination step for causing the control unit to determine, when an error occurs, whether or not an occurrence position of the error is in the cache region; and a control step for causing the control unit, when it is determined that the occurrence position is in the cache region, to exclude a specific management unit including the occurrence position among the management units from the allocation target in the cache region, and to control the data reading and writing operations using remaining management units in the plural management units.

According to the present invention, it is possible to prevent blocking of the controller having an error which occurs in a cache region as much as possible.

BRIEF DESCRIPTION OF THE DRAWINGS

FIG. 2 shows an example of a connection configuration between a CPU and a memory as shown in FIG. 1;

FIG. 3 shows an example of setting the memory as shown in FIG. 1;

FIG. 4 shows an example of supplementary information about the memory setting as shown in FIG. 3;

FIG. 5 shows a configuration example of a hardware failure management table;

FIG. 6 shows a configuration example of a replacement target management table;

FIG. 7 shows a configuration of a cache directory;

FIG. 8 shows a configuration example of a reverse lookup table;

FIG. 9 shows an example of a free list;

FIG. 10 shows an example of a usage exclusion list;

DETAILED DESCRIPTION

Hereinbelow, preferred embodiments according to the present invention will be described in accordance with the accompanying drawings.

Figure 1:
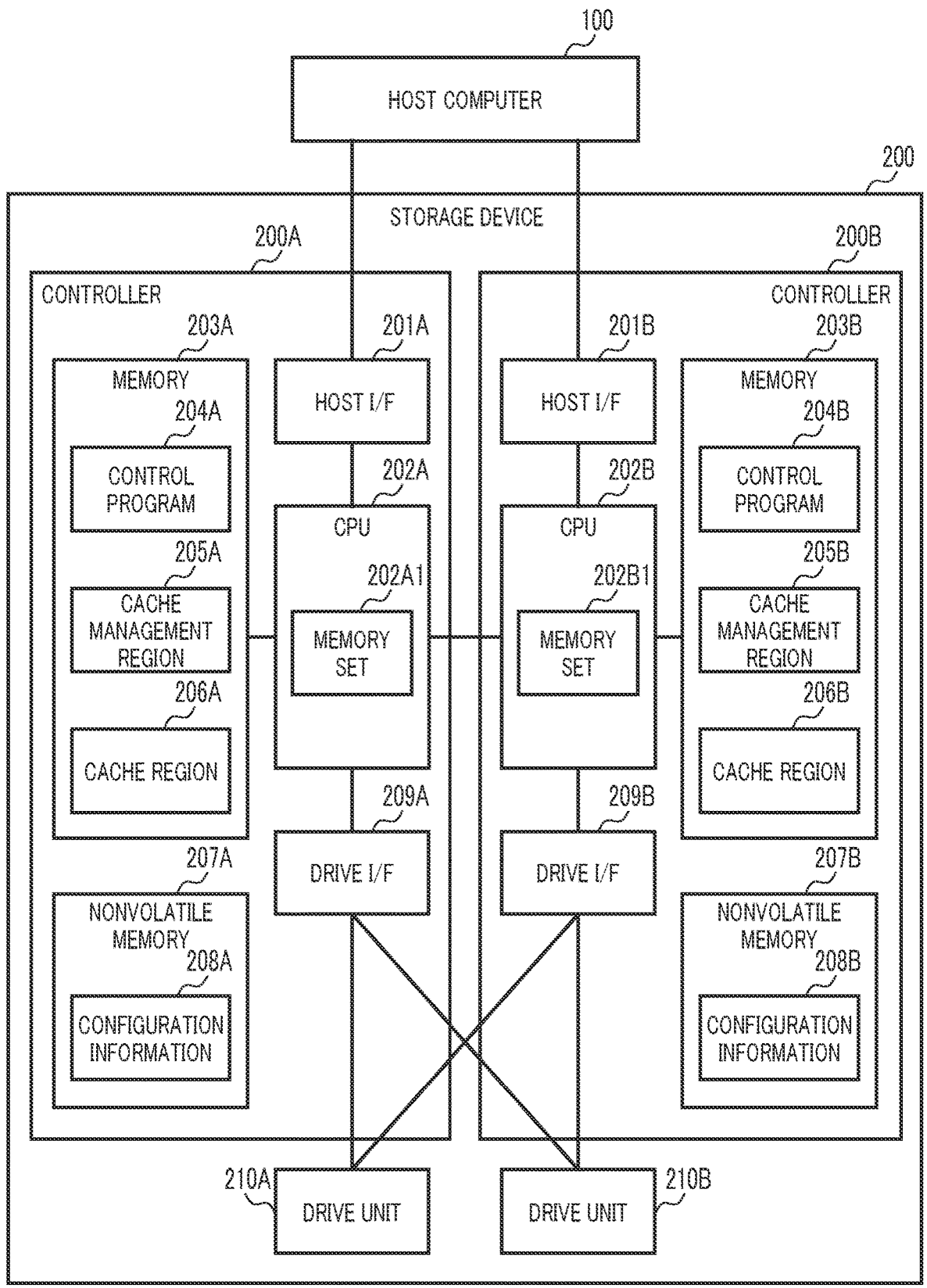
FIG. 1 mainly shows a system configuration diagram representing a configuration example of a storage device according to an embodiment.

FIG. 1 is a system configuration diagram mainly representing a configuration example of a storage device 200 according to an embodiment. The storage device 200 is connected to a host computer (hereinafter abbreviated as a "host") 100 for data reading/writing operations with respect to the host 100. The storage device 200 formed of at least one unit of a computer implements an error processing method to be described later by running a control program 204A on the computer.

The storage device 200 includes multiple controllers, for example, controllers 200A and 200B. More than two controllers may be installed in the storage device 200. The controllers 200A and 200B have the respective functions duplexed, and are almost similarly configured. An explanation of the configuration of the controller 200B is, thus, omitted hereinafter except the one necessary to be described in terms of its relationship with the controller 200A.

The controller 200A includes a host I/F 201A, a CPU (Central Processing Unit) 202A, a memory 203A, a non-volatile memory 207A, a drive I/F 209A, and a drive unit 210A.

The host I/F 201A is connected to the CPU 202A via a signal line of PCI express standard, for example. As an interface with the host 100, the host I/F 201A connected to the host 100 via a fiber channel or Ethernet exchanges data with the host 100 using such protocol as iSCSI (Internet Small Computer System Interface). The host I/F 201A receives a reading/writing request from the host 100, interprets the content of the request, and delivers the request to the CPU 202A.

In response to the request from the host 100 via the host I/F 201A, the CPU 202A controls data reading/writing operations with respect to a cache region 206A, and the drive unit 210A via the drive I/F 209A. Specifically, the CPU 202A performs data reading/writing operations with respect to the memory 203A using Channels from "0" to "4". The CPU 202A controls data reading/writing operations by the control program 204A between the drive units 210A and 210B via the drive I/F 209A with reference to configuration information 208A of the nonvolatile memory 207A while accessing (a cache management region 205A, and the cache region 206A of) the memory 203A.

The CPU 202A includes a memory set unit (corresponding to a "memory set" in the drawing) 202A1. The memory set unit 202A1 is a register for memory space management for the memory 203A. The memory set unit 202A1 stores set information (refer to FIG. 3 and FIG. 4 to be described below) about memory setting to be described later. The set information about the memory set is stored in a nonvolatile manner in the nonvolatile memory 207A as a part of the configuration information 208A. The set information read from the nonvolatile memory 207A is stored in the memory set unit 202A1. The set information about the memory set indicates a range from the starting address to the ending address for defining each memory space in the memory 203A with respect to the address space thereof (for example, each memory at Rank "O", "1", the cache region 206A) from the side of the CPU 202A.

The CPU 202A is connected to a CPU 202B of the other controller 200B via a predetermined signal line. Occasionally, the CPU 202A stores the request received from the host 100 via the host I/F 201A in a cache region 206B of the other controller 200B. In this case, the CPU 202A is allowed to order the CPU 202B of the other controller 200B to obtain and transfer the request and the like from the cache region 206B, and to store the request and the like in the cache region 206A.

The CPU 202A constantly monitors occurrence of an error. Upon occurrence of an error, the CPU 202A outputs an error number for identifying the error, a position where the error has occurred (the starting address and the ending address for defining the occurrence position in the memory 203A), error information about occurrence of an uncorrectable error, and the number of occurrences of the uncorrectable error.

For example, the memory 203A is configured at a dual Rank (Rank "0", "1") of DIMM (Dual Inline Memory Module) standard. The memory 203A includes the control program 204A, the cache management region 205A, and the cache region 206A. Under the control of the CPU 202A, the control program 204A controls data reading/writing operations with respect to the host 100 via the host I/F 201A.

The cache region 206A is a storage region to which multiple segments as an example of multiple management units are allocated to allow temporary storage of data in accordance with data reading/writing operations executed by the control program 204A with respect to the host 100. A segment number is given to each segment in the cache region 206A. The cache region 206A allows storage of data in the segment as an allocation target under the control of the control program 204A. Data are not stored in the specific segment excluded from the allocation target.

The control program 204A as an example of a control unit controls data reading/writing operations under the control of the CPU 202A. When an error occurs, it is determined whether or not the error occurrence position is in the cache region 206A. If it is determined that the occurrence position is in the cache region 206A, among the multiple segments, the specific segment having the occurrence position is excluded from the allocation target in the cache region 206A. The segments remaining in the multiple segments are used for controlling the data reading/writing operations.

The control program 204A determines whether or not the error is correctable. If it is determined that the error is not correctable, the specific segment is excluded from the allocation target.

The cache management region 205A is a storage region for storing management information of the cache region 206A. The management information includes each segment number of the multiple segments in the cache region 206A, and includes the starting address to the ending address of each of those segments.

The cache management region 205A manages a cache directory, a reverse lookup table, a free list, and a usage exclusion list, all of which are described later. The cache directory manages a correlation between multiple segments (storage unit) of the respective logical volumes (hereinafter simply abbreviated as a "volume") for data storage, and the segment (management unit) in the cache region 206A. A segment number is given to each segment of the respective volumes.

The reverse lookup table 205C is a table for deriving the volume number of the volume for storing specific data, and the segment number in the volume, from the segment number of the segment in the cache region 206A for storing the specific data.

The usage exclusion list manages identification information (segment number in the cache region) indicating the specific management unit excluded from the allocation target. The free list indicates the segment number of an unused segment in the cache region 206A. Details of the cache directory, the reverse lookup table, the free list, and the usage exclusion list are described later.

The nonvolatile memory 207A stores the configuration information 208A in a nonvolatile manner. The configuration information 208A includes the set information about setting of the memory, a hardware failure management table 211, and a replacement target management table 212, details of which are described later. The hardware failure management table 211 is a table for managing an error occurrence position in the cache region 206A. The replacement target management table 212 is a table for managing the cache as a replacement target, which includes the cache region 206A having the specific segment excluded from the allocation target. Details of the configuration information 208A is described later.

The drive unit 210A is constituted by at least a single drive unit, for example, an SSD (Solid State Drive), which enables nonvolatile data storage. In the embodiment, multiple drive units 210A are used to constitute a RAID (Redundant Array of Independent Disks), for example. Alternatively, the drive unit 210A may be formed as a magnetic disk device. In the embodiment, multiple drive units 210A are used to constitute at least one volume. Each segment of the volume can store data as a target for reading/wiring operations with respect to the host 100.

The drive I/F 209A is connected to the CPU 202A via a signal line of PCI-Express (Peripheral Component Interconnect-Express) standard, for example. The drive I/F 209A is an interface with the drive units 210A, 210B, and controls data reading/writing operations using such protocol as Serial Attached SCSI (Small Computer System Interface).

When the CPU 202A receives a data writing request from the host 100 via the host I/F 201A, the storage device 200 temporarily stores the data in the cache region 206A as well as in the cache region 206B of the other controller 200B via the predetermined signal line, to manage the data by duplexing.

When the duplexing is completed, the CPU 202A notifies the host 100 of completion of the writing operation to the cache region 206A via the host I/F 201A. The CPU 202A stores the data temporarily stored in the cache region 206A in the volume constituted by the drive units 210A, 210B as described later, and upon completion of the storage, further notifies the host 100 of completion of the writing operation to the volume via the host I/F 201A.

When receiving a data reading request from the host 100 via the host I/F 201A, the CPU 202A reads the data from the volume, and temporarily stores the data in the cache region 206A. The CPU 202A supplies the data temporarily stored in the cache region 206A to the host 100 via the host I/F 201A.

FIG. 2 shows a configuration example of connection between the CPU 202A and the memory 203A as shown in FIG. 1. As described above, the memory 203A is of DIMM (Dual Inline Memory Module) standard with a dual Rank (Rank "0", "1") configuration. The CPU 202A is connected to the memory 203A at Rank 0 and Rank 1 through four channels so that data reading/writing operations are controlled with respect to the memory 203A through the respective channels.

FIG. 3 shows an example of setting of the memory 203A as shown in FIG. 1. The set information related to setting of the memory 203A partially constitutes the configuration information 208A. A set value of item "Channel selection bit" is "6-7". A set value of item "Rank selection bit" is "8".

FIG. 4 shows an example of supplementary information about setting of the memory 203A as shown in FIG. 3. For example, a physical address is in a range from 0 to 40. At the physical address "6-7", data of "00" through the Channel "0", "01" through the Channel "1", "10" through the Channel "2", and "11" through the Channel "3" are managed. The data "0" and "1" at the physical address "8" indicate the Rank "0" and "1", respectively.

FIG. 5 shows a configuration example of the hardware failure management table 211. The hardware failure management table 211 partially constitutes the configuration information 208A. The hardware failure management table 211 manages an error number, an error occurrence address, information about whether an uncorrectable error occurs or not, and the number of occurrences of correctable errors, for each error which has occurred in the memory 203A.

When an error occurs in the memory 203A, the CPU 202A registers the error number, the error occurrence address, the error information about occurrence of an uncorrectable error, and the number of occurrences of correctable errors in the hardware failure management table 211.

FIG. 6 shows a configuration example of a replacement target management table 212. As described above, the replacement target management table 212 partially constitutes the configuration information 208A. The replacement target management table 212 represents a list of the replacement target caused by occurrence of error (hereinafter referred to as a "replacement target list"). The replacement target management table 212 indicates that the replacement target is of DIMM (memory 204A) standard at Rank "1" through the Channel "O", and a serial number is "0x12345678". In the replacement target management table 212, the replacement target is written by the CPU 202A every time when the uncorrectable error occurs.

FIG. 7 shows a configuration of the cache directory 213. The cache directory 213 is stored in the cache management region 205A. The cache directory 213 manages a volume number for identifying each volume, a segment number in the volume, a segment number in the cache region 206A, and an attribute. The cache directory 213 is a table for a reference to the attribute of the segment number in the cache region 206A from the volume number, and the segment number in the volume. The cache directory 213 may be configured to manage the address corresponding to each of the segment numbers.

For example, the attribute includes "Clean" and "Dirty". The attribute "Clean" represents that the data stored in the segment with the segment number in the volume with the volume number coincide with data stored in the segment with the segment number in the cache region 206A. Meanwhile, the attribute "Dirty" represents that the data stored in the segment with the segment number in the volume with the volume number does not coincide with data stored in the segment with the segment number in the cache region 206A.

The attribute "Clean" represents that the data stored in the segment with the segment number in the cache region 206A coincide with data written into the drive unit 210A. This means that no adverse influence is caused by loss of the data in the cache region 206A. Meanwhile, the attribute "Dirty" represents that the data stored in the segment with the segment number in the cache region 206A does not coincide with the data written into the drive unit 210A. In this case, it is necessary to prevent loss of the data in the cache region 206A. No data coincidence indicates that the data writing request from the host 100 has been received, but has not been reflected on the volume. However, the data have been duplexed between the controllers 200A and 200B like the case of the data coincidence. The attribute "-" represents that data are not stored in any of the segments in the cache region 206A.

When the data are stored in the segment with the segment number "3" in the cache region 206A corresponding to the segment number "0" in the volume with the volume number "0", the attribute is "Clean". This represents that the data stored in the segment with the segment number in the cache region 206A coincide with the data written into the drive unit 210A. Referring to FIG. 7, all entered data are not always text data, but may have the tree or hash structure.

FIG. 8 shows a configuration example of the reverse lookup table 205C. The reverse lookup table 205C is stored in the cache management region 205A. As described above, the reverse lookup table 205C is a table for deriving the volume number of the volume for storing the data, and the segment number in the volume from the segment number of the segment in the cache region 206A for storing the data. That is, making reference to the reverse lookup table 205C allows reverse lookup of the cache directory 213.

The reverse lookup table 205C manages the segment number in the cache region 206A, the volume number, and the segment number in the volume. Explanations of the segment number in the cache region 206A, the volume number, and the segment number in the volume are omitted because of similarity to those described referring to FIG. 8.

FIG. 9 shows an example of the free list 205D. The free list 205D is stored in the cache management region 205A, and updated by the control program 204A under the control of the CPU 202A. As described above, the free list 205D indicates the segment number of an unused segment in the cache region 206A. The example in the drawing represents that the segments with numbers "0" and "5" are not in use.

FIG. 10 shows an example of the usage exclusion list 205E. The usage exclusion list 205E is stored in the cache management region 205A, and updated by the control program 204A under the control of the CPU 202A. The example in the drawing represents that the segment with the segment number "2" in the cache region 206A is a usage exclusion target.

The storage device 200 according to the embodiment is configured as above. An example of an error processing method to be implemented in the storage device 200 is described. The error processing method for a storage device 200 having multiple controllers 200A, 200B provided with CPUs 202A, 202B for controlling data reading and writing operations with respect to at least one host computer 100 includes: a management unit allocation step for causing the CPU 202A, 202B to allocate multiple segments capable of temporarily storing the data to each of the cache regions 206A, 206B of the controllers 200A, 200B in accordance with the data reading and writing operations under the control of the control program 204A; a determination step for causing the CPU 202A to determine, when an error occurs, whether or not an occurrence position of the error is in the cache region 206A under the control of the control program 204A; and a control step for causing the CPU 202A, when it is determined that the occurrence position is in the cache region 206A, to exclude a specific segment including the occurrence position among the multiple segments from the allocation target in the cache region 206A, and to control the data reading and writing operations using segments remaining in the multiple segments.

Figure 11:
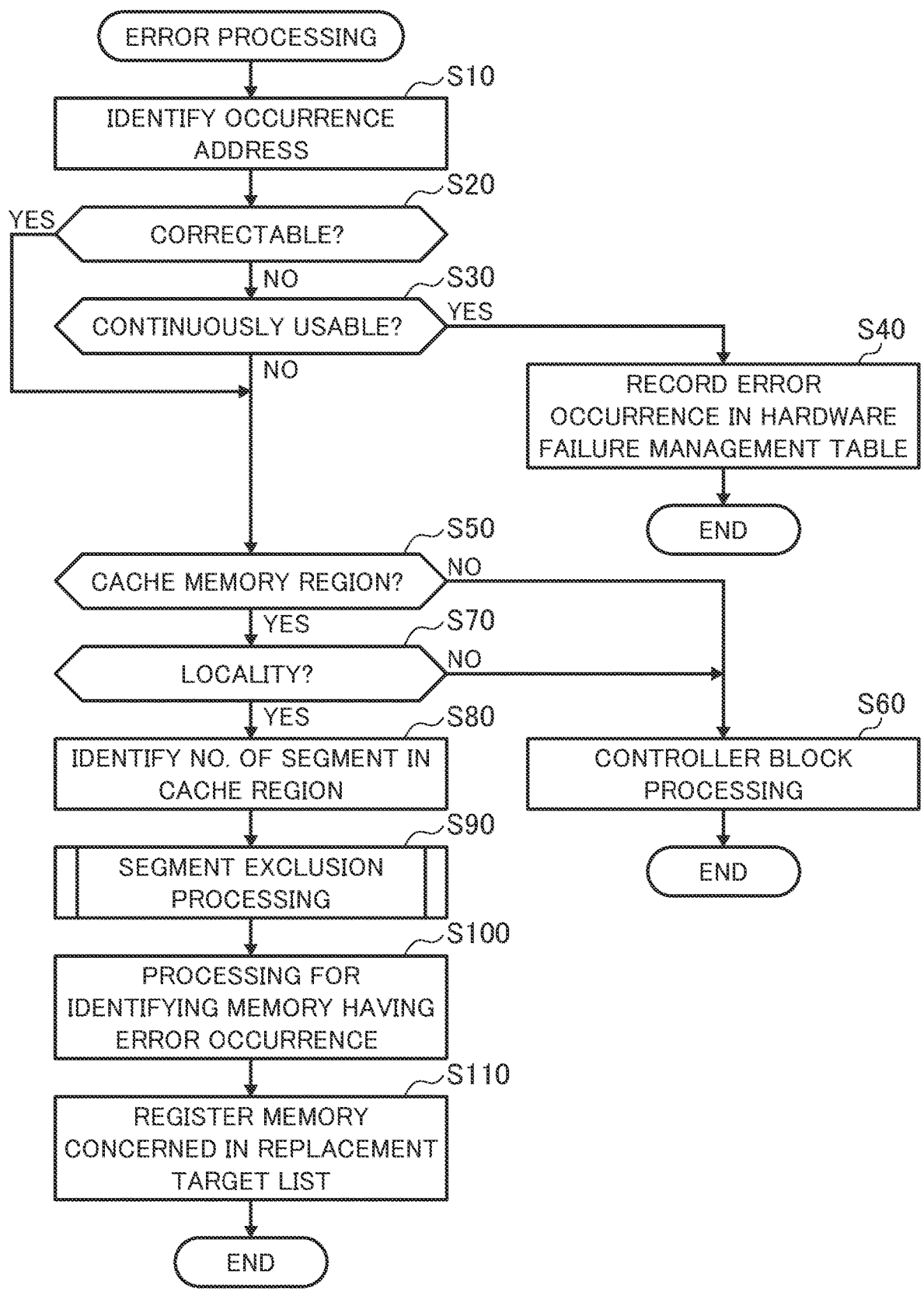
FIG. 11 is a flowchart representing an example of an error processing procedure of the storage device according to the embodiment.

FIG. 11 is a flowchart representing an example of an error processing procedure in the storage device 200 according to the embodiment. The control program 204A is caused to execute the error processing under the control of the CPU 202A. The following description, however, is simplified on the assumption that the control program 204A executes the error processing. The controller 200A is mainly described as follows except that the controller 200B involves the specific processing.

The free list 205D manages the segment number of the segment in which data are not stored in the cache management region 205A. The control program 204A uses the respective segments in the cache management region 205A with reference to the free list 205D.

The storage device 200 causes the control program 204A of the controller 200A to constantly detect an error. When an error occurs, it is determined whether or not the error has occurred in the cache region 206A. If the error has occurred in the cache region 206A, the program obtains an error No., information about whether or not the error which has occurred is correctable, and an error occurrence address corresponding to a position at which the error has occurred.

In step S10, when an error occurs, the control program 204A obtains an error occurrence address from the hardware failure management table 211. In step S20, the control program 204A determines whether or not the error is correctable. If it is determined that the error is not correctable, the control program 204A executes step S30. If it is determined that the error is correctable, step S50 is executed as described later.

In step S30, the control program 204A determines whether or not continuous usage is possible. Specifically, if the error is correctable, and the number of error occurrences in the segment with the address which includes the occurrence address is equal to or smaller than a threshold value, the control program 204A determines that the continuous usage is possible.

If it is determined that the continuous usage is possible, the control program 204A executes step S40. If it is determined that the continuous usage is not possible, step S50 is executed as described later.

In step S40, the control program 204A records the error number indicating occurrence of the error in the hardware failure management table 211. The error processing is then finished.

Meanwhile, in step S50, the control program 204A determines whether or not the error occurrence position is in the cache region 206A. If it is determined that the error occurrence position is not in the cache region 206A, the control program 204A executes a controller block processing. In the controller block processing, the control program 204A blocks the controller (the controller 200A in this example) having the error occurred (step S60).

Meanwhile, if it is determined that the error occurrence position is in the cache region 206A, the control program 204A determines that there is a locality in the error occurrence position (step S70). Specifically, in the case where errors have occurred at multiple positions in the cache region 206A, the control program 204A determines whether or not the error occurrence positions are concentrated in the specific area of the cache region 206A.

If it is determined that there is no locality, the control program 204A executes the controller block processing. If it is determined that locality exists, the segment number in the cache region 206A is identified with reference to the usage exclusion list 205E (step S80).

The control program 204A executes a segment exclusion processing (step S90). Specifically, the control program 204A adds the segment number of the segment to the usage exclusion list 205E (refer to FIG. 10) as a part of the configuration information 208A. When the segment number of the segment is added to the usage exclusion list 205E, the control program 204A no longer uses the segment with the segment number. Details of the segment exclusion processing is described later.

The control program 204A executes an error occurrence memory identification processing (step S100) to identify the memory having the error. Specifically, the control program 204A constantly obtains the error information. Based on the error information, the memory having the error (the memory 203A in this case) is identified.

The control program 204A registers the memory 203A in the replacement target management table 212 (refer to FIG. 6) (step S110).

Figure 12:
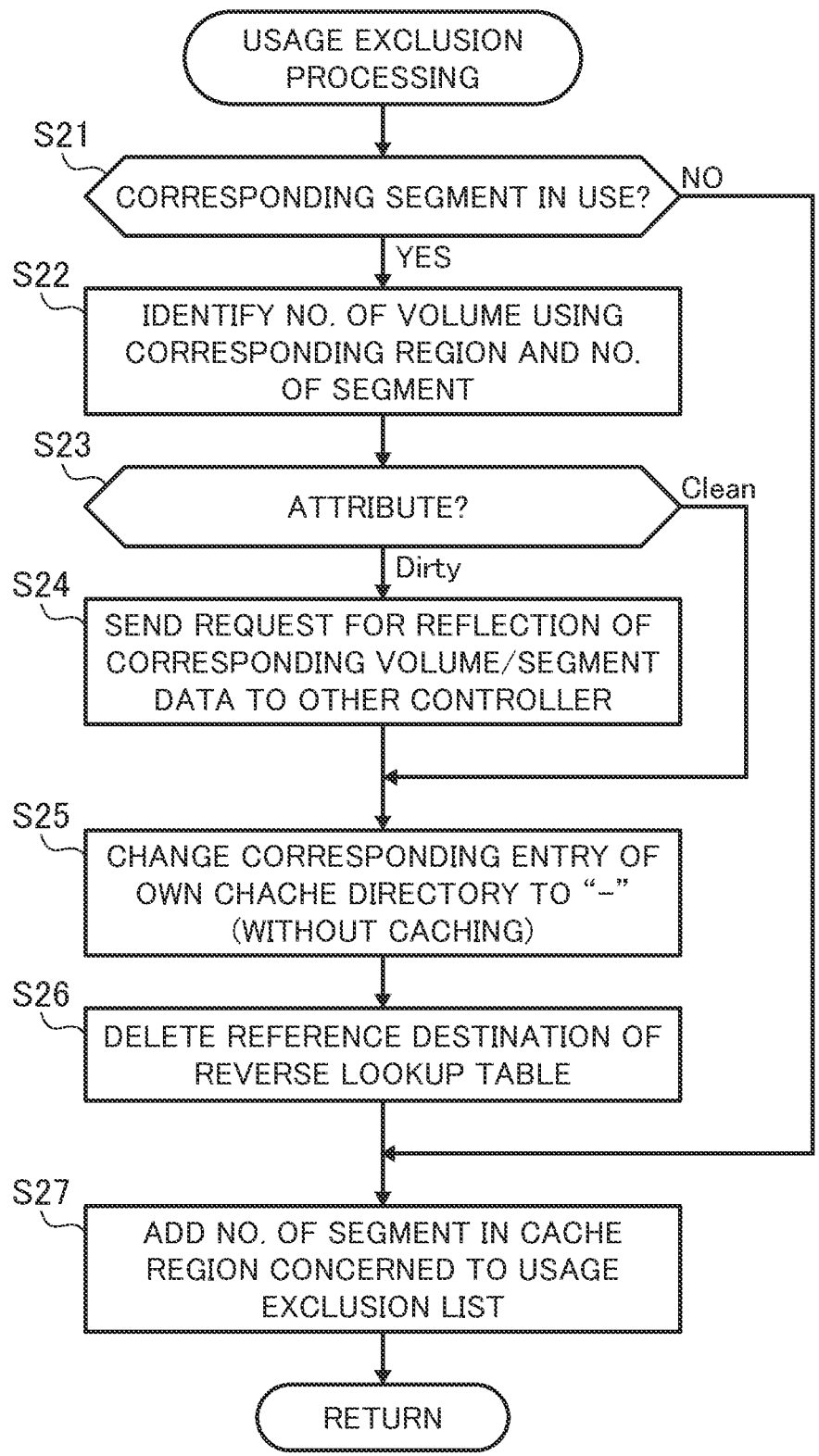
FIG. 12 is a flowchart representing an example of a specific segment exclusion processing procedure as shown in FIG. 11.

FIG. 12 is a flowchart representing a specific example of a segment exclusion processing procedure as shown in FIG. 11. In step S21, the control program 204A determines whether or not the segment is in use.

Specifically, the control program 204A determines whether or not the segment is in use with reference to the free list 205D. When the segment is not in use, the control program 204A executes step S27.

When it is determined that the segment is in use, the control program 204A identifies the volume number of the volume using the cache region 206A having the error occurrence position, and the segment number in the volume with reference to the reverse lookup table 205C (step S22).

The control program 204A confirms the attribute corresponding to the volume number with reference to the cache directory 213 (step S23). If the attribute is "Clean", the control program 204A executes step S25 to be described later. If the attribute is "Dirty", step S24 is executed.

In step S24, the control program 204A sends a request to the other controller 200B to reflect data of the segment in the volume. Then in step S25, the control program 204A changes the entry into the cache directory 213 of the own controller 200A to "-" (without caching).

In step S26, the control program 204A deletes a reference destination of the reverse lookup table 205C. The control program 204A further adds the segment number in the cache region 206A to the usage exclusion list 205E.

Figure 13:
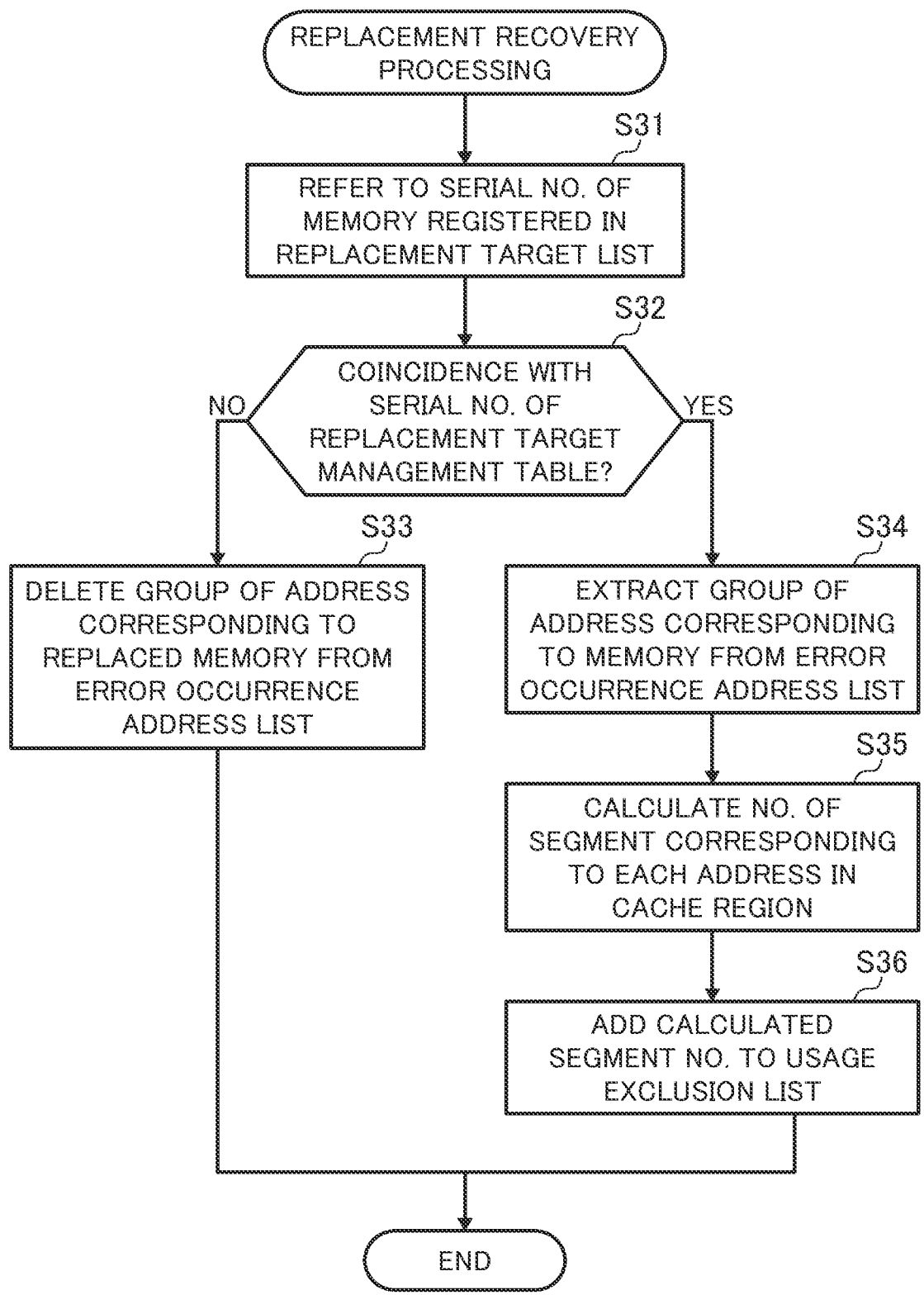
FIG. 13 shows an example of a replacement recovery processing procedure.

FIG. 13 shows an example of a replacement recovery processing procedure. In step S31, the control program 204A refers to a serial number of the memory 203A registered as a replacement target list of the replacement target management table 212.

The control program 204A determines with respect to coincidence with the serial number of the replacement target management table 212. If non-coincidence is determined (for example, the memory 203A has been replaced), the control program 204A deletes an address group corresponding to the replaced memory 203A from the error occurrence address list (step S33).

If coincidence is determined (for example, the memory 203A has not been replaced), the control program 204A executes step S34. In step S34, the control program 204A extracts an address group corresponding to the memory 203A from the error occurrence address list.

In step S35, the control program 204A calculates the segment number in the cache region 206A, which corresponds to each address. In step S36, the control program 204A adds the calculated segment number to the usage exclusion list 205E.

The storage device 200 according to the embodiment includes multiple controllers 200A, 200B for controlling data reading and writing operations with respect to at least one host computer. The controllers 200A, 200B include cache regions 206A, 206B to which multiple segments (management units) capable of temporarily storing the data are allocated in accordance with the data reading and writing operations, and a control unit (CPU 202A, control program 204A) for controlling the data reading and writing operations. When an error occurs, the control unit determines whether or not an occurrence position of the error is in the cache region 206A. When it is determined that the occurrence position of the error is in the cache region 206A, the control unit excludes, among the multiple segments, a specific segment that contains the occurrence position of the error from an allocation target in the cache region 206A to control the data reading and writing operations using segments remaining in the multiple segments.

Even if an error occurs in the cache region 206A, the configuration ensures to avoid blocking of the controller having the error as much as possible. Even if an error occurs in the cache region 206A, the controller having the error can be continuously operated. This allows the storage device 200 to continue data reading/writing operations by the controllers 200A, 200B to the utmost. In the case where the other controller has an error, and is blocked, the frequency of system going down as the whole storage device 200 can be reduced.

In the embodiment, the control program 204A determines whether or not the error which has occurred in the cache region 206A is correctable under the control of the CPU 202A. If the error is not correctable, the specific segment is excluded from the allocation target. This ensures to prevent blocking of the controller including the cache region 206A having the correctable error, and to attain stable operation of the storage device 200 as a whole.

In this embodiment, each of the controllers 200A, 200B includes the usage exclusion list 205E for managing the segment number indicating the specific segment excluded from the allocation target. This ensures to control the control program 204A not to use the segment with the segment number managed by the usage exclusion list 205E in the cache region 206A by mistake.

In this embodiment, each of the controllers 200A, 200B includes the cache directory 213 for managing a correlation between the multiple segments in the volume for storing data and the multiple segments in the cache region 206A for storing the data. This allows the control program 204A to easily grasp the correlation between the segment in the volume having the data stored, and the segment in the cache region 206A having the data stored.

In this embodiment, each of the controllers 200A, 200B includes the hardware failure management table 211 for managing the error occurrence position in the cache region 206A. This allows easy recognition of the hardware to be replaced only by referring to the hardware failure management table 211.

In this embodiment, each of the controllers 200A, 200B includes the replacement target management table 212 for managing the cache as the replacement target, which includes the cache region 206A having the specific segment excluded from the allocation target. This allows easy recognition of the cache to be replaced only by referring to the hardware failure management table 211.

The present invention is not limited to the embodiment as described above, and includes various modifications and equivalent configurations within the scope of the appended claims. For example, the above-described embodiments have been described in detail in order to facilitate the understanding of the present invention, and the present invention is not necessarily limited to those including all of the described configurations. The respective elements described in parallel in the embodiment may be interpreted that at least one of the elements is connected to other elements in series.

The present invention is applicable to the storage device which relates to the technology for avoiding blocking of the controller as a whole despite the error which occurs in the cache region of the storage device.

What is claimed is:

1. A storage device comprising a plurality of controllers for controlling data reading and writing operations with respect to at least one host computer, wherein each of the controllers includes:

a cache region to which a plurality of management units capable of temporarily storing the data are allocated in accordance with the data reading and writing operations; and a control unit for controlling the data reading and writing operations, and when an error occurs, the control unit determines whether or not an occurrence position of the error is in the cache region, and when it is determined that the occurrence position is in the cache region, the control unit excludes, among the plural management units, a specific management unit that contains the occurrence position from an allocation target in the cache region, to control the data reading and writing operations using remaining management units in the plural management units.

2. The storage device according to claim 1, wherein the control unit determines whether or not the error is correctable, and, when the error is not correctable, the control unit excludes the specific management unit from the allocation target.

3. The storage device according to claim 2, wherein each of the controllers includes a usage exclusion list for managing identification information indicating the specific management unit excluded from the allocation target.

4. The storage device according to claim 1, wherein each of the controllers includes a cache directory for managing a correlation between plural storage units in a volume which stores the data, and the plural management units in the cache region which stores the data.

5. The storage device according to claim 1, wherein each of the controllers includes a hardware failure management table for managing the occurrence position in the cache region.

6. The storage device according to claim 1, wherein each of the controllers includes a replacement target management table for managing a cache as a replacement target, that includes the cache region having the specific management unit excluded from the allocation target.

7. An error processing method for a storage device having a plurality of controllers each provided with a control unit for controlling data reading and writing operations with respect to at least one host computer, the error processing method comprising:

a management unit allocation step for causing the control unit to allocate a plurality of management units capable of temporarily storing the data to each cache region of the controllers in accordance with the data reading and writing operations;

a determination step for causing the control unit to determine, when an error occurs, whether or not an occurrence position of the error is in the cache region; and a control step for causing the control unit, when it is determined that the occurrence position is in the cache region, to exclude a specific management unit including the occurrence position among the management units from the allocation target in the cache region, and to control the data reading and writing operations using remaining management units in the plural management units.

8. The error processing method according to claim 7, wherein in the management unit allocation step, the control unit determines whether or not the error is correctable, and, when the error is not correctable, excludes the specific management unit from the allocation target.

9. The error processing method according to claim 8, wherein each of the controllers includes a usage exclusion list for managing identification information indicating the specific management unit excluded from the allocation target, and in the control step, the control unit controls the data reading and writing operations so as not to use the specific management unit corresponding to identification information managed in the usage exclusion list.

10. The error processing method according to claim 7, wherein each of the controllers includes a cache directory for managing a correlation between a plurality of storage units in a volume which stores the data, and the plural management units in the cache region which stores the data, and in the control step, the control unit identifies a predetermined storage unit in the volume corresponding to a predetermined management unit in the cache region with reference to the cache directory.

* * * * *